US006846864B2

United States Patent
Lensvelt et al.

(10) Patent No.: US 6,846,864 B2
(45) Date of Patent: Jan. 25, 2005

(54) COMPOSITION AND ARTICLE FOR REDUCED FOOD ADHESION

(75) Inventors: Cornelis Johannes Lensvelt, Bergen op Zoom (NL); Jan Paul Penning, Bergen op Zoom (NL); Robert Puyenbroek, Bergen op Zoom (NL)

(73) Assignee: General Electric Company, Pittsfield, MA (US)

( * ) Notice: Subject to any disclaimer, the term of this patent is extended or adjusted under 35 U.S.C. 154(b) by 222 days.

(21) Appl. No.: 10/064,023

(22) Filed: Jun. 4, 2002

(65) Prior Publication Data

US 2002/0177639 A1 Nov. 28, 2002

Related U.S. Application Data

(62) Division of application No. 09/598,184, filed on Jun. 21, 2000, now Pat. No. 6,437,031, which is a division of application No. 09/300,861, filed on Apr. 28, 1999, now abandoned.

(51) Int. Cl.$^7$ .......................... C08K 3/00; C08K 3/22; C08K 5/10; C08K 5/20; C08L 81/06
(52) U.S. Cl. ................. 524/230; 524/232; 524/233; 524/306; 524/315; 524/430; 524/445; 524/449; 524/451; 524/456; 525/166; 525/179; 525/180; 525/189
(58) Field of Search ............................. 524/230, 232, 524/233, 306, 315, 430, 445, 449, 451, 456; 525/166, 179, 180, 189

(56) References Cited

U.S. PATENT DOCUMENTS

| 3,520,845 A | 7/1970 | McKeown et al. |
| 3,668,193 A | 6/1972 | King |
| 4,139,576 A | 2/1979 | Yoshimura et al. |
| 4,433,104 A | 2/1984 | Giles, Jr. |
| 4,532,054 A | 7/1985 | Johnson |
| 4,599,383 A | 7/1986 | Satoji |
| 4,724,251 A | 2/1988 | Rock |
| 4,798,855 A | 1/1989 | Lausberg et al. |
| 4,987,188 A | 1/1991 | Furno et al. |
| 5,009,959 A | 4/1991 | Matsushita et al. |
| 5,039,575 A * | 8/1991 | Mori et al. .................. 428/463 |
| 5,115,004 A | 5/1992 | Mochizuki et al. |
| 5,502,099 A | 3/1996 | Wallace |
| 5,670,010 A | 9/1997 | Hagiwara et al. |
| 5,726,232 A | 3/1998 | Egami et al. |
| 5,780,576 A | 7/1998 | Weber et al. |
| 5,959,031 A | 9/1999 | Thurgood |
| 6,228,915 B1 | 5/2001 | Lensvelt |
| 6,437,031 B1 * | 8/2002 | Lensvelt et al. ............. 524/154 |

FOREIGN PATENT DOCUMENTS

| WO | WO 95/21216 | 8/1995 |
| WO | WO 00/27927 | 5/2000 |

* cited by examiner

Primary Examiner—Ana L. Woodward

(57) ABSTRACT

The invention relates to a composition and article for reducing food deposit adhesion to cookware. More specifically this invention relates to a resin composition comprising a polysulfone or polyethersulfone resin having a glass transition temperature of at least 180° C., a fluorinated polyolefin, and a fatty acid amide. The invention also relates to an article comprising the composition.

23 Claims, No Drawings

COMPOSITION AND ARTICLE FOR REDUCED FOOD ADHESION

CROSS-REFERENCE TO RELATED APPLICATIONS

This application is a division of U.S. application Ser. No. 09/598,184 filed 21 Jun. 2000 now U.S. Pat. No. 6,437,031 and incorporated herein by reference, which is a division of U.S. application Ser. No. 09/300,861 filed 28 Apr. 1999 now abandoned and incorporated herein by reference.

FEDERALLY SPONSORED RESEARCH

Not applicable.

BACKGROUND OF THE INVENTION

1. Field of the Invention

The invention relates to compositions and methods for reducing food deposit adhesion to cookware. More specifically this invention relates to a resin composition having a glass transition temperature of at least 180° C. containing an amount of at least one fluorinated compound effective to reduce food deposit adhesion on cookware made from the composition. The resin composition may optionally contain at least one fatty acid ester, fatty acid amide, anionic surfactant, or a mixture containing at least one of the foregoing. The invention also relates to a method for providing plastic cookware having reduced food deposit adhesion.

2. Brief Description of the Related Art

Plastic cookware has gained increased acceptance and use in recent years due in part to their relatively low cost, durability with light weight, and flexibility in design. Unfortunately, adhesion of food deposits and the accompanying stains as observed with more traditional metal cookware is also obtained with plastic cookware. Non-stick cookware has been developed as a solution to adhesion of food deposits to reduce sticking and ease cleaning.

Methods to prepare non-stick cookware generally involve application of a surface treatment or lamination of a thin non-stick layer to the surface of the cookware. These methods are expensive and reduce the cycle time of the manufacturing process. What is needed in the art is a method for reducing the adhesion of food deposits on plastic cookware without secondary steps.

SUMMARY OF THE INVENTION

The method of the present invention to reduce adhesion of food deposits on cookware comprises a resin with a glass transition temperature of at least 180° C. and an amount of at least one fluorinated compound effective to reduce food deposit adhesion on cookware made from the composition. The resin composition may optionally contain at least one fatty acid ester, fatty acid amide, anionic surfactant, or a mixture containing at least one of the foregoing. The invention also includes the compositions and articles made from the compositions having reduced adhesion of food deposits. Various features and advantages of the present invention will be appreciated and understood by those skilled in the art from the following detailed description.

DETAILED DESCRIPTION OF THE INVENTION

According to this invention, there is a method provided to reduce adhesion to food deposit on cookware made from at least one resin having a glass transition temperature of at least 180° C. The need for the high glass transition temperature is to allow for the high temperatures common during food preparation. Accordingly, the resins have to have sufficient heat resistance to resist deformation during use. Suitable resins include polycarbonates, polyimides, polyamides, polyamideimides, polysulfones such as polyarylsulfones, including polyphenylsulphones, polyethersulfones, polyetherketones, polyetheretherketones, aromatic copolyesters, and polyetherimides as well as various blends containing at least one of the foregoing resins. These resins are generally known in the art as are methods for the preparation.

In one embodiment, the resin is a polyetherimide resin comprising structural units of the formula (1):

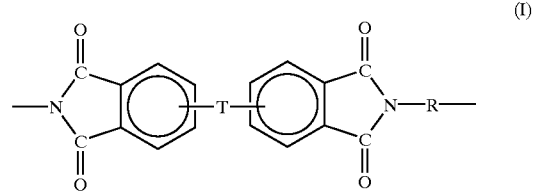

wherein the divalent T moiety bridges the 3,3', 3,4', 4,3', or 4,4' positions of the aryl rings of the respective aryl imide moieties of formula (I); T is —O— or a group of the formula —O—Z—O—; Z is a divalent radical selected from the group consisting of formulae (II):

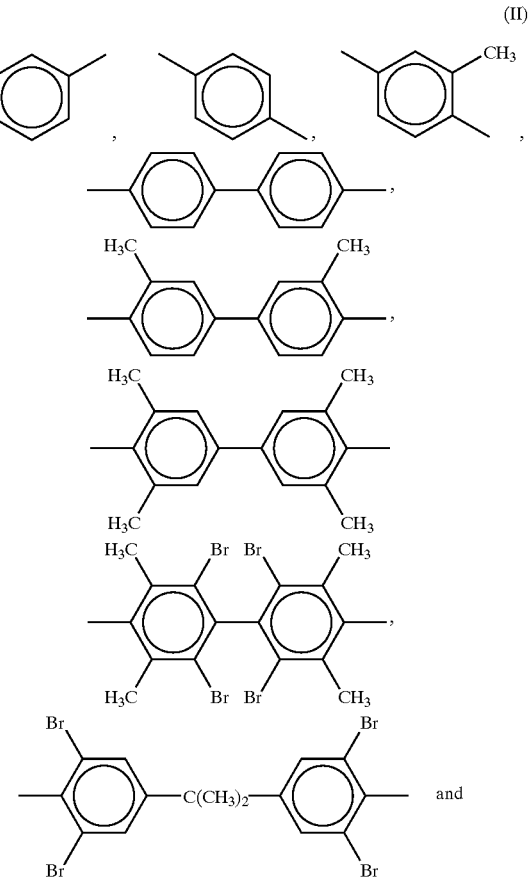

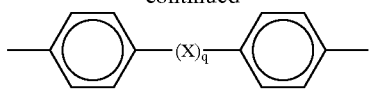

wherein X is a member selected from the group consisting of divalent radicals of the formulae (III):

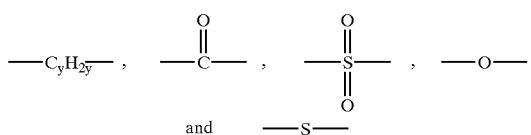
(III)

wherein y is an integer from 1 to about 5, and q is 0 or 1; R is a divalent organic radical selected from the group consisting of: (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, and (d) divalent radicals of the formula (IV):

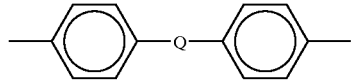
(IV)

where Q is a member selected from the group consisting of formulae (V):

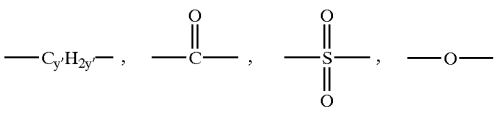
(V)

where y' is an integer from about 1 to about 5. A particularly preferred polyetherimide resin is the reaction product formed by melt polymerization of 2,2-bis[4-(3,4-dicarboxyphenoxy)phenyl]propane dianhydride with one or more of paraphenylene diamine and metaphenylene diamine. The resins are commercially available from GE Plastics under the mark ULTEM resins.

Other particularly useful resins include polysulfones having repeating units of the formulae (VI), (VI), (VIII), (IX), and (X):

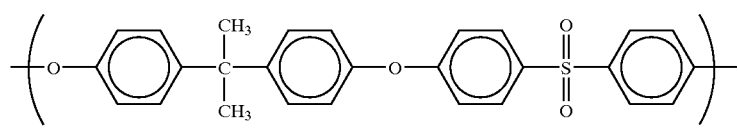
(VI)

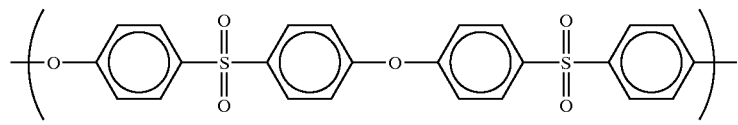
(VII)

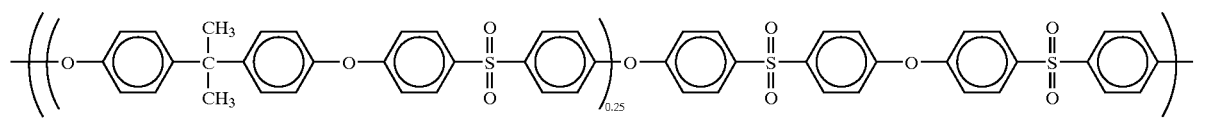
(VIII)

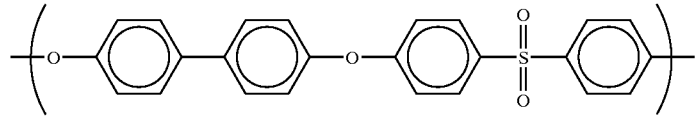
(IX)

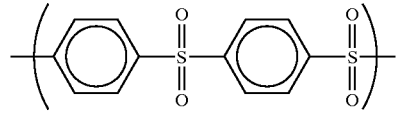
(X)

These materials are commercially available from BASF, Amoco, and ICI under a variety of tradenames.

Other particularly useful resins include polyamideimides of the formulae (XI), (XII), and (XIII) wherein n is an integer greater than about 20, preferably greater than about 50:

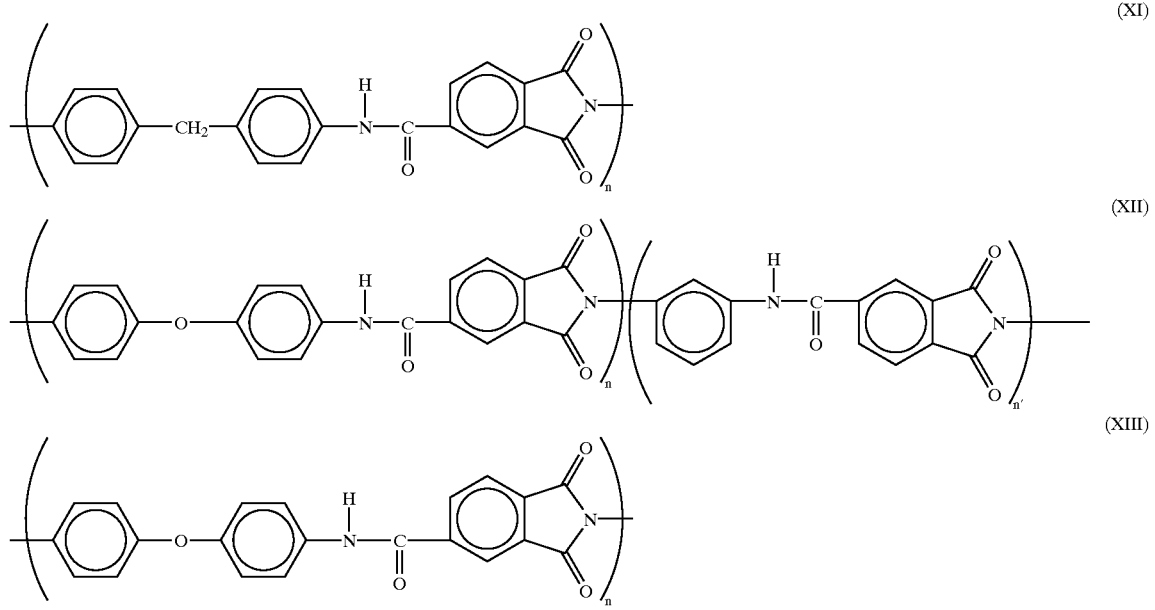

(XI)

(XII)

(XIII)

Typical commercially available polyamideimides are sold under the trademark TORLON by Amoco Performance Products.

Other particularly useful resins include polyetherketones of the formulae (XIV), (XV), and (XVI) wherein n is an integer greater than about 20, preferably greater than about 50:

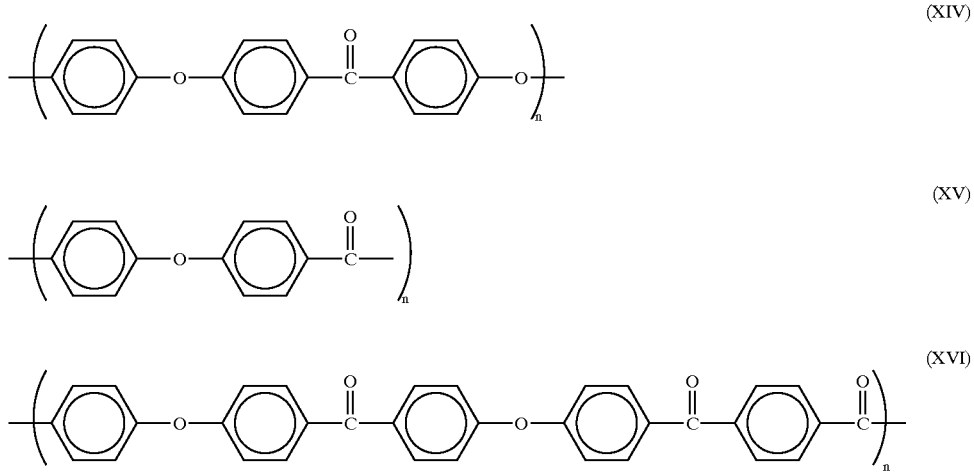

(XIV)

(XV)

(XVI)

Typical commercially available polyetherketones are sold under the trademarks VICTREX and ULTRAPEK by BASF.

A second key component of the present invention is an amount of at least one fluorinated compound. The fluorinated compound preferably includes at least one fluorinated polyolefin or fluorinated siloxane or fluorinated siloxane polymer. The fluorinated polyolefins generally have an essentially crystalline structure and preferably have a melting point in excess of about 120° C. The fluorinated polyolefins are preferably a polymer of one or more fluorinated monomers containing ethylenic unsaturation and optionally one or more other compounds containing ethylenic unsaturation. The fluorinated monomer may be a perfluorinated monoolefin, for example hexafluoropropylene or tetrafluoroethylene, or a partially fluorinated monoolefin which may contain other substituents, e.g., chlorine or perfluoroalkoxy, for example vinylidene fluoride, chlorotrifluoroethylene and perfluoroalkyl vinyl ethers in which the alkyl group contains up to six carbon atoms, e.g., perfluoro (methyl vinyl ether). The monoolefin is preferably a straight or branched chain compound having a terminal ethylenic double bond and containing less than six carbon atoms, especially two or three carbon atoms. When units derived from monomers other than fluorine-containing monomers are present, the amount thereof is preferably less than 30 mole %, generally less than 15 mole %. Such other monomers include, for example, olefins containing less than six carbon atoms and having a terminal ethylenic double bond, especially ethylene and propylene. Suitable fluorinated olefins include fluorinated polyethylenes comprising repeating units of the structural formula (XVII):

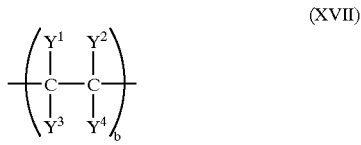

(XVII)

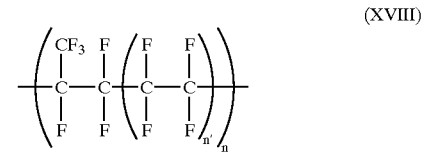

(XVIII)

wherein b is an integer in excess of 50 and $Y^1$ to $Y^4$, which may be the same or different, are selected from the group consisting of hydrogen, chlorine, bromine and fluorine, with the proviso that at least one of $Y^1$ to $Y^4$ is fluorine. Preferred fluorinated polyethylenes for the purposes of the present invention include poly(vinyl fluoride), poly(vinylidene fluoride), polytrifluoroethylene, polychlorotrifluoroethylene, polybromotrifluoroethylene, polytetrafluoroethylene, and copolymers thereof. A particularly preferred fluorinated polyethylene is polytetrafluoroethylene. Other suitable fluorinated polyolefins include polyperfluoropropane, perfluorobutadiene and polyhexafluoropropylene.

More specifically, polytetrafluoroethylenes are fully fluorinated polyethylenes of the basic chemical formula $(-CF_2-CF_2-)_n$ that contains about 76% by weight fluorine. These polymers are highly crystalline and have a crystalline melting point of over 300° C. Commercial polytetrafluoroethylenes are available from E. I. duPont de Nemours & Co., Inc. under the tradename Teflon and from Imperial Chemical Industries under the tradename Fluon. Polychlorotrifluoroethylene and polybromotrifluoroethylene are also available in high molecular weights and can be employed in blends of the instant invention. Other preferred fluorinated polyethylenes are homopolymers and copolymers of vinylidene fluoride. Poly(vinylidene fluoride) homopolymers are the partially fluorinated polymers of the chemical formula $(-CH_2-CF_2-)_n$. These polymers are tough linear polymers with a crystalline melting point at 170° C. Commercial homopolymer is available from Pennwalt Chemicals Corporation under the tradename Kynar. The term "poly(vinylidene fluoride)" as used herein refers not only to the normally solid homopolymers of vinylidene fluoride, but also to the normally solid copolymers of vinylidene fluoride containing at least 50 mole percent of polymerized vinylidene fluoride units, preferably at least about 70 mole percent vinylidene fluoride and more preferably at least about 90% vinylidene fluoride units. Suitable compnomers are halogenated olefins containing up to 4 carbon atoms, for example, dichlorodifluoroethylene, vinyl fluoride, vinyl chloride, vinylidene chloride, perfluoropropene, perfluorobutadiene, chlorotrifluoroethylene, trichloroethylene, tetrafluoroethylene and the like. Commercially available fluorinated polyolefins of this class include copolymers of vinylidene fluoride and hexafluoropropylene such as Viton A, Viton A35 and Viton AHV sold by E. I. du Pont; copolymers of vinylidene fluoride, hexafluoropropylene and tetrafluoroethylene such as Viton B and Viton B50 sold by E. I. du Pont; copolymers of vinylidene fluoride, hexafluoropropylene and tetrafluoroethylene such as Dynamar sold by Dyneon; and copolymers of vinylidene fluoride and chlorotrifluoroethylene such as Kel-F sold by Minnesota Mining and Manufacturing Co. Additional examples of preferable fluororesins include a copolymer of tetrafluoroethylene and hexafluoropropylene represented by the following formula (XVIII):

Among typical resins of this type, there are "Teflon FEP-J" (produced by Mitsui Fluorochemical) and "Neoflon FEP" (produced by Daikin Kogyo).

The fluorinated siloxanes and related fluorinated siloxane polymers (collectively referred to herein as "fluorinated siloxane compounds") useful in the present invention include fluorinated siloxanes and related fluorinated polymers having mono-, oligo-, or perfluorinated alkyl group having one to about nine carbon atoms or a mono-, oligo-, or perfluorinated aryl group. Useful fluoroalkyl-functional organosilanes, or polymeric derivatives thereof, include those of the formula:

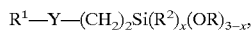

wherein $R^1$ is a mono-, oligo- or perfluorinated alkyl group having one to about nine carbon atoms or a mono-, oligo- or perfluorinated aryl group, Y is a $CF_2$, $CH_2$, O, or S group, $R^2$ is a linear, branched or cyclic alkyl group having one to about eight carbon atoms or an aryl group and R is a linear, branched or cyclic alkyl group having one to about eight carbon atoms or an aryl group and x is between 0 and about 1. Specific examples include: tridecafluoro-1,1,2,2-tetrahydrooctyl-1-trimethoxysilane, tridecafluoro-1,1,2,2-tetrahydrooctyl-1-triethoxysilane, 3,3,4,4,5,5,6,6,7,7,8,8,8-tridecafluorooctyltriethoxysilane, and the corresponding mixtures.

The fluoro-alkyl functional organosilanes can be used directly as an additive in the present invention. Alternatively, the organosilanes may be polymerized through the reactive alkoxysilyl functionality to afford fluoro-alkyl functional oligo- and polysiloxanes, which can be used as an effective additive in the present invention.

The compositions of the invention may optionally contain at least one of fatty acid ester, fatty acid amide, anionic surfactant, or a mixture containing at least one of the foregoing effective to reduce food deposit adhesion on articles and cookware made from the composition.

The optional fatty acid esters and fatty acid amides are derivatives of saturated and unsaturated normal fatty acids having from about fourteen to about thirty-six carbon atoms, inclusive. Representative fatty acids are, for example, tetradecanoic, pentadecanoic, hexadecanoic, heptadecanoic, octadecanoic, nonadecanoic, eicosanoic, henecosanoic, decosanoic, tricosanoic, tetracosanoic, pentacosanoic, hexacosanoic, triacontanoic, hentriacontanoic, dotriacontanoic, tetratriacontanoic, pentatriacontanoic, hexatriacontanoic acids, myristic, palmitic, stearic, arachidic, behenic and hexatrieisocontanoic ($C_{36}$) acids, palmitoleic, oleic, linolenic and cetoleic, and the like.

The methods of preparation of fatty acid esters and fatty acid amides employed are generally known in the art. For example, fatty acid esters are commonly prepared by the reaction of an alcohol and a fatty acid or a fatty acid derivative, such as a fatty acid halide. Polyols are also useful to prepare fatty acid polyesters, as are the corresponding polyamines to prepare fatty acid polyamides. Representative polyols are ethylene glycol, 1,3-propanediol, 1,4-butanediol, 1,5-pentanediol 1,6-hexanediol, a polyglycol such as diethylene glycol, triethylene glycol, dipropylene glycol, dibutylene glycol, trimethylene glycol, isobutylene-ethylene glycol, trimethylene glycol; the monoethyl, monopropyl or monobutyl ethers of glycerol, dicyclopentadienyl dimethanol, pentaerythritol, dipentaerythritol, tripentaerythritol, trimethylolpropane, trimethylolethane, etc., glycerol, glycerol mono-acetate, mannitol, sorbitol, xylose, and the like, or mixtures thereof.

In one embodiment of the invention, the optional fatty amides are preferred as a food release additive in combination with at least one fluorinated compound. Included as additives are saturated fatty acid monoamide (preferably, lauramide, palmitamide, behenamide, 1,2-hydroxy stearamide); unsaturated fatty acid monoamide (preferably, oleamide, erucamide, recinoleamide); and N-substituted fatty acid amide (more preferably, N-stearyl stearamide, N-behenyl behenamide, N-stearyl behenamide, N-behenyl stearamide, N-oleyl oleamide, N-oleyl stearamide, N-stearyl oleamide, N-stearyl erucamide, N-oleyl palmitamide; methylol amide (more preferably, methylol stearamide, methylol behenamide); saturated fatty acid bis-amide (more preferably, methylene bis-stearamide, ethylene bis-stearamide, ethylene bis-isostearamide, ethylene bis-hydroxystearamide, ethylene bis-behenamide, hexamethylene bis-stearamide, hexamethylene bis-behenamide, hexamethylene bis-hydroxystearamide, N,N'-distearyl adipamide, N,N'-distearyl sebacamide); unsaturated fatty acid bis-amide (more preferably, ethylene bis-oleamide, hexamethylene bis-oleamide, N,N'-dioleyl adipamide, N,N'-dioleyl sebacamide; saturated or unsaturated fatty acid tetra amide, stearyl erucamide, ethylene bis stearamide and ethylene bis oleamide.

A large number of useful fatty amides are commercially available from Humko Chemical Company, Memphis, Tenn. under the Kemamide tradename and include, for example, Kemamide B (behenamide/arachidamide), Kemamide W40 (N,N'-ethylenebisstearamide), Kemamide P181 (oleyl palmitamide), Kemamide S (stearamide), Kemamide U (oleamide), Kemamide E (erucamide), Kemamide O (oleamide), Kemamide W45 (N,N'-ethylenebisstearamide), Kenamide W20 (N,N'-ethylenebisoleamide), Kemamide E180 (stearyl erucamide), Kemamide E221 (erucyl erucamide), Kemamide S180 (stearyl stearamide), Kemamide S221 (erucyl stearamide), and the like. In addition, useful fatty amides are commercially available from Croda Universal Ltd., Hull East Yorkshire, England, under the Crodamide tradename and include, for example, Crodamide OR (oleamide), Crodamide ER (erucamide), Crodamide SR (stearamide), Crodamide BR (behenamide), Crodamide 203 (oleyl palmitamide), Crodamide 212 (stearyl erucamide), and the like.

Another optional group useful as food release additives with the at least one fluorinated compound are the phosphonium sulfonates illustrated by the general formula (XI) below:

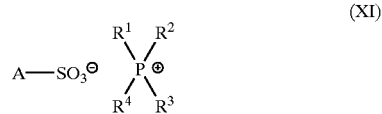

(XI)

wherein A is an alkyl group with 1–36 carbon atoms, alkenyl group with 4–24 carbon atoms, phenyl group, phenyl group substituted by alkyl group with 1–18 carbon atoms, naphthyl group or naphthyl group substituted by alkyl group with 1–18 carbon atoms, $R^1$, $R^2$ and $R^3$ are identical, each being an aliphatic hydrocarbon group with 1–8 carbon atoms or aromatic hydrocarbon group, and $R^4$ is a hydrocarbon group with 1–18 carbon atoms.

Phosphonium sulfonate shown by (XI) is composed of an organic sulfonate anion and an organic phosphonium cation. Examples of such organic sulfonate anion include aliphatic sulfonates such as methyl sulfonate, ethyl sulfonate, propyl sulfonate, butyl sulfonate, octyl sulfonate, lauryl sulfonate, myristyl sulfonate, hexadecyl sulfonate, 2-ethylhexyl sulfonate, docosyl sulfonate and tetracosyl sulfonate and their mixtures, substituted phenyl sulfonates such as p-tosylate, butylphenyl sulfonate, dodecylphenyl sulfonate, octadecylphenyl sulfonate, and dibutylphenyl, sulfonate, and substituted or unsubstituted naphthyl sulfonates such as naphthyl sulfonate, diisopropyl naphthyl sulfonate and dibutyinaphthyl sulfonate. Examples of aforementioned phosphonium cation include aliphatic phosphonium such as tetramethyl phosphonium, tetraethylphosophonium, tetrabutyl phosphonium, triethylmethyl phosphonium, tributylmethyl phosphonium, tributylethyl phosphonium, trioctylmethyl phosphonium, trimethylbutyl phosphonium, trimethyloctyl phosphonium, trimethyllauryl phosphonium, trimethylstearyl phosphonium, triethyloctyl phosphonium and tributyloctyl phosphonium and aromatic phosphoniums such as tetraphenyl phosphonium, triphenylmethyl phosphonium, triphenylbenzyl phosphonium, and tributylbenzyl phosphonium.

Phosphonium sulfonates of the present invention can be obtained by any combination of any of these organic sulfonate anions and organic phosphonium cations but this invention is not limited by the examples given above. Phosphonium sulfonate of the present invention can be produced by mixing metal salt of corresponding organic sulfonate and quaternary phosphonium salt in a solvent and washing out the byproduct inorganic salt with water or extracting the product with an organic solvent such as methanol, isopropanol or acetone.

Also useful are the ammonium sulfonate analogues of the phosphonium sulfonates. In these additives, the quaternary phosphonium salt is replaced by an ammonium salt. In certain embodiments of the present invention, preferred ammonium salts include monoethanolamine, triethanolamine, and lower alkylammonium salts including those having from three to about ten carbon atoms such as isopropyl ammonium, tetramethyl ammonium, and tetrabutyl ammonium salts.

An effective food-releasing amount of the additive (or additives) is employed in the thermoplastic composition. Any amount of additive that reduces the amount of food adhesion to obtain an acceptable cleanliness after washing is an effective food releasing amount provided that the physical properties are substantially maintained or improved in the final composition as compared to the composition not containing the additive. In general, an effective amount of the additives ranges from about 0.1 to about 5.0 weight percent, preferably about 0.1 to about 4.0 weight percent, based on the total weight of the composition. An actual amount depends on many factors, including the effectiveness of the particular additive as a food releasing agent and the degree of food release desired.

Compositions of the present invention can also include effective amounts of at least one additive selected from the group consisting of anti-oxidants, flame retardants, drip retardants, crystallization nucleators, dyes, pigments, colorants, reinforcing agents, fillers, stabilizers, antistatic agents, plasticizers and lubricants to change the properties/characteristics of the composition. These additives are known in the art, as are their effective levels and methods of incorporation. Effective amounts of the additives vary widely, but they are usually present in an amount up to about 50% or more by weight, based on the weight of the entire composition.

Mineral fillers are utilized in one embodiment of the invention. Useful mineral fillers include clays, talcs, micas, barium sulfate, titanium dioxide, wollastonites, zinc oxides, and the like. An especially preferred mineral filler is titanium dioxide. When used, the amount of mineral filler is generally up to about 50% by weight based on the weight of the entire composition.

Preparation of the compositions of the present invention is normally achieved by melt blending the ingredients under conditions for the formation of an intimate blend. Such conditions often include mixing in single or twin screw type extruders or similar mixing devices that can apply a shear to the components. It is often advantageous to apply a vacuum to the melt through a vent port in the extruder to remove volatile impurities in the composition.

All of the ingredients may be added initially to the processing system, or else certain additives may be pre-compounded with each other. It appears that certain properties, such as impact strength and elongation, are sometimes enhanced by initially pre-dispersing any fillers with a portion of the resin to make a concentrate and subsequently letting down the concentrate with additional resin and any additional ingredients. While separate extruders may be used, these compositions may also be prepared by using a single extruder having multiple feed ports along its length to accommodate the addition of the various components. It is also sometimes advantageous to employ at least one vent port in each section between the feed ports to allow venting (either atmospheric or vacuum) of the melt. Those of ordinary skill in the art will be able to adjust blending times and temperatures, as well as component addition location and sequence, without undue additional experimentation.

The compositions of the present invention are useful for making molded articles such as cooking utensils and baking trays and pans as well as various other molded articles. It should be clear that the present invention affords a method to reduce food adhesion to molded articles as well as a method to provide easier cleaning of molded articles.

All references cited herein are hereby incorporated in their entireties.

The following examples are provided to illustrate the process according to the present invention. It should be understood that the examples are given for the purpose of illustration and do not limit the invention.

EXAMPLES

Example 1

A typical example of the claimed composition comprises 88.4% by weight of polyetherimide resin (Ultem® 1010-1000 resin available from GE Plastics, Vicat softening point of 215° C.), 10.7% by weight of $TiO_2$ and 0.9% by weight of poly (tetrafluoroethylene), PTFE. The particular PTFE grade used in this Example is Zonyl MP-1600 obtained from Du Pont de Nemours Int'l SA, Geneva, Switzerland.

A dry-mixture of polyetherimide resin and PTFE is fed, simultaneously with $TiO_2$ powder, to the throat of a 25 mm twin screw extruder operated at 300 rpm and 360° C. The resulting material is pelletized, dried and Dynatup disks are injection molded using a 130 ton Stork injection molding unit at melt temperature 360° C., injection pressure 80 bar and mold temperature 160° C.

The adhesion to food deposits of the above blend formulation was determined according to the following procedure: The Dynatup disks were wetted with a starch solution (Roux Blanc), dried and heated at 180° C. in air for 20 min. The soiled disks were washed for ca. 2 min at 65° C. in a Hobart multitank dishwasher using a 3 g/100 ml Divojet (alkaline) detergent solution. The washed samples were stained with potassium iodide solution to detect the presence of carbohydrate residues on the substrate. All tests were done in duplo, i.e. using two disks of a given formulation. Each sample was subjected to the described treatment five times and the cleanliness of the sample surface was rated visually after each test. The average performance (i.e., surface cleanliness after washing) for each formulation was rated according to the following scale: 1=very bad; 2=poor; 3=reasonable; 4=good. The described test was performed at DiverseyLever, Maarssenbroeksedijk 2, P. O. Box 10, 3600AA Maarssen, The Netherlands.

Mechanical, impact and heat properties of injection molded test bars were tested according to standard ISO procedures. Results are given in Table 1.

Example 2

As Example 1, with a composition comprising 89.1% by weight of polyetherimide resin (Ultem® 1010-1000 resin), 10.7% by weight of $TiO_2$ and 0.2% by weight of an olefinic fluorocopolymer comprising tetrafluoroethylene, hexafluoropropylene and vinylidene-fluoride monomers.

Example 3

As Example 1, with a composition comprising 88.4% by weight of polyetherimide resin (Ultem® 1010-1000 resin), 10.7% by weight of $TiO_2$ and 0.9% by weight of a olefinic fluorocopolymer comprising tetrafluoroethylene, hexafluoropropylene and vinylidene-fluoride monomers.

Example 4

As Example 1, with a composition comprising 88.8% by weight of polyetherimide resin (Ultem® 1010-1000 resin), 10.7% by weight of $TiO_2$ and 0.5% by weight of a fluoroalkyl-trialkoxysilane, viz. 3,3,4,4,5,5,6,6,7,7,8,8,8-tridecafluorooctyltriethoxysilane(Dynasylan F8261 from Sivento Chemie Rheinfelden GmbH).

Example 5

As Example 1, with a composition comprising 84.8% by weight of polyetherimide resin (Ultem® 1010-1000 resin), 10.7% by weight of $TiO_2$ and 4.5% by weight of poly (tetrafluoroethylene) (Zonyl MP-1600). This Example is included to show that fluoro-additives lose their effectiveness as non-sticking agent in food release applications when the concentration of additive exceeds 4% by weight.

Other examples may include thermoplastic resins with a Vicat softening point above 180° C., such as: polyimides, polyamideimides, polysulfones such as polyarylsulfones, including polyphenylsulfones, polyethersulfones, polyetherketones, polyetheretherketones, aromatic copolyesters, and the like.

TABLE 1

Properties of thermoplastic compositions described in the Examples.

| | China ware | Reference 1 | Reference 2 | Example 1 | Example 2 | Example 3 | Example 4 | Example 5 |
|---|---|---|---|---|---|---|---|---|
| Ultem 1010 resin | N/A | 100% | 89.3% | 88.4% | 89.1% | 88.4% | 88.8% | 84.8% |
| Inorg. Filler | N/A | N/A | 10.7% $TiO_2$ | 10.7% $TiO_2$ | 10.7% $TiO_2$ | 10.7% $TiO_2$ | 10.7% TiO2 | 10.7% $TiO_2$ |
| Fluorinated Compound | N/A | N/A | N/A | 0.9% PTFE | 0.2% fluoro-copolymer | 0.9% fluoro-copolymer | 0.5% fluoroalkyl-trialkoxysilane | 4.5% PTFE |
| Food Adhesion Rating | 1 (very bad) | 1 (very bad) | 1 (very bad) | 4 (good) | 3 (reasonable) | 3 (reasonable) | 3 (reasonable) | 1 (very bad) |
| E-Modulus (Mpa) | | 3225 | 3458 | 3597 | 3607 | 3609 | 3602 | 3342 |
| Yield Stress (Mpa) | | 111 | 111 | 111 | 110 | 110 | 111 | 107 |
| Yield Strain (%) | | 7.0 | 6.5 | 5.7 | 5.6 | 5.6 | 5.7 | 6.6 |
| INI (kJ/m2) | | 4.4 | 4.6 | 5.1 | 5.0 | 5.1 | 5.1 | 5.2 |
| Vicat (° C.) | | 214 | 216 | 213 | 212 | 212 | 213 | 215 |

As can be noted by the data in Table 1, reduced food deposit adhesion on articles was achieved with the compositions of the invention. This result was unexpected based on the prior art for reducing food deposit adhesion on articles.

The preceding examples are set forth to illustrate specific embodiments of the invention and are not intended to limit its scope. It should be clear that the present invention includes articles from the compositions as described herein. Additional embodiments and advantages within the scope of the claimed invention will be apparent to one of ordinary skill in the art.

What is claimed is:

1. A resin composition comprising:

a) a polysulfone resin, a polyethersulfone resin or a blend containing one of the foregoing resins with a glass transition temperature of at least 180° C. wherein the polysulfone and/or polyethersulfone consist essentiallly of repeating units selected from the group consisting of

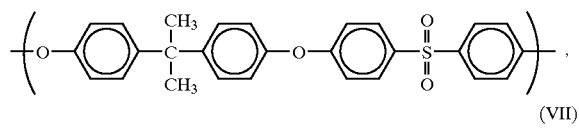
(VI)

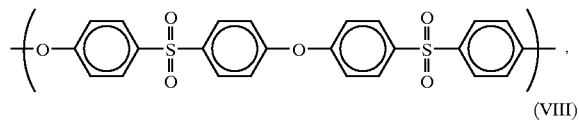
(VII)

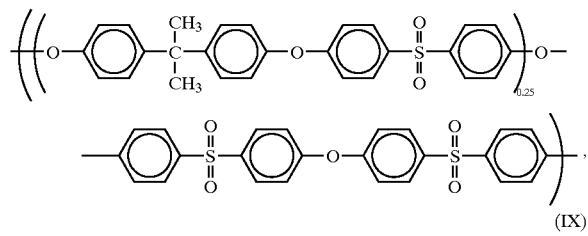
(VIII)

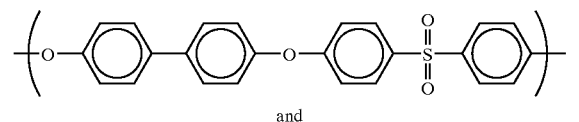
and

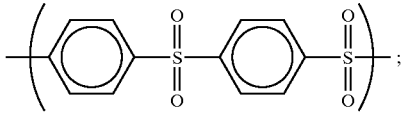
(X)

b) at least one fluorinated polyolefin in an amount up to about 4% by weight effective to reduce food deposit adhesion on cookware made from the composition; and c) a fatty acid amide.

2. The composition of claim 1, comprising the polysulfone resin.

3. The composition of claim 1, comprising the polyethersulfone resin.

4. The composition of claim 1, wherein the fluorinated polyolefin is a ploymer of a perfluorinated monoolefin or a partially fluorinated monolefin.

5. The composition fo claim 1, wherein the fluorinatd polyolefin is a polymer of one or more fluorinated monomers containing ethylenic unsaturation and optionally, one or more other compounds containing ethylenic unsaturation.

6. The composition of claim 1, wherein the fluorinated polyolefin is at least one of poly(vinyl fluoride), poly(vinylidene fluoride), polytrifluoroethylene, polychlorotrifluoroethylene, polybromotrifluoroethyiene, polytetrafluoroethylene, or copolymers thereof.

7. The comopsition of claim 1, wherein the fluorinated polyolefin is a compolymer of tetrafluoroethylene and hexafluoropropylene.

8. The composition of claim 1, wherein the fluorinated polyolefin is a fluorinated polyethylene comprising repeating units of the structural formula:

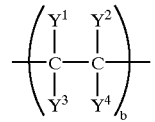

wherein b is an ingerger in excess of 50 and $Y^1$ to $Y^4$, which may be the same or different, are selected from the group comsisting of hydrogen, chlorine, bromine and fluorine, whth the proviso that at least one $Y^1$ to $Y^4$, is fluorine.

9. The composition of claim 1, wherein the at least one fluorinated polyolefin is present at about 0.1% to about 4% by weight.

10. The composition of claim 1, wherein the fatty acid amide is at leasr one of lauramide, palmitamide, behenamide, 1,-hydrox stearamide, oleamide, erucamide, recinoleamide, N-stearyl stearamide, N-behenyl behenamide, N-stearyl behenamide, N-behenyl stearamide, N-oleyl oleamide, N-oleyl stearamide, N-stearyl oleamide, N-stearyl erucamide, N-oleyl palamitamide, methylol stearamide, methylol be-henamide, methylene bis-stearamide, etheylene bis-isostearanudem ethylene bis-hydroxystearamide, ethylene bis-behenamide, hexamethylene bis-stearamide, hexamethylene bis-behenamide, hexamethylene bis-hydroxystearamide, N,N'-distearyl adipamide, N,N'-disterayl sebacamide, hexamethylene bis-oleamide, N,N'-dioleyl adipamide, N,N'-dioleyl sebacamide, N,N'-ethylenebisstearamide, N,N'-ethylenebisoleamide, erucycl enucamide, or erucyl stearamide.

11. The composition of claim 1, wherein the fatty acid amide is at least one of behenamide, arachidamide, N,N'-ethylenebissearamide, oleyl palmitamide, oleamide, erucamide, oleamide, N,N'-ethylenebissearamide, N,N'-ethylenebisoleamide, stearyl erucamide, erucyl erucamide, stearyl stearamide, or erucyl stearamide.

12. The composition of claim 1, wherein the fatty acid amid is N,N'-ethylenebisstearamide.

13. The composition of claim 1, wherein the fatty acid amide is stearyl erucamide.

14. The composition of claim 1, comprising about 0.1 to about 5 weight percent of the fatty acid amide.

15. The composition of claim 1. further comprising a resin selected from the consisting of polycarbonates, polyimides, polyetherimides, polyamides, polyamideimides, polyetherketones, aromatic copolyesters and blends of the foregoing resins.

16. The compositon of claim 1, further comprising a least one fluorinated siloxane or fluorinated polysiloxane.

17. The composition of claim 1, further comprising a mineral filler selected form the group consisting of clays talcs, micas, barium sulfates, titanium dioxides, wollastonites, and zinc oxides.

18. The composition of claim 1, further comprising a food release additive selected from the group consisting of fatty acid esters anionic surfactants, and mixtures thereof.

19. The composition clain 1 further comprising at least one additive selected from the group consisting of anti-oxidants, flame retardants, drip retardants, crystallazation nucleators dyes, pigments, colorants reinforcing agents, fillers, stabilizers, antistatic agents, and plasticizers.

20. An article comprising the composition of claim 1.

21. A resin composition consisting essentially of:
a polysulfone or polyrethersulfone resin with a glass transistion temperature of at least 180° C. wherein the polysulfone or polyethersulfone consist essentially of repeating units selected from the group consisting of

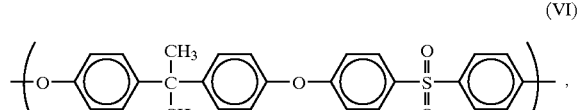

(VI)

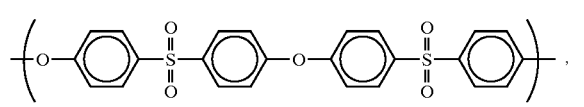

(VII)

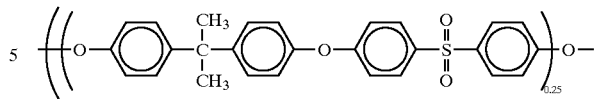

(VIII)

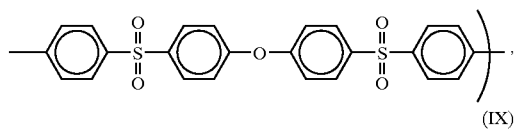

(IX)

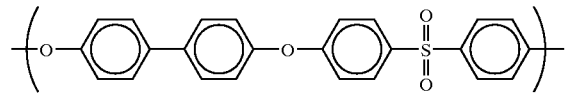

and

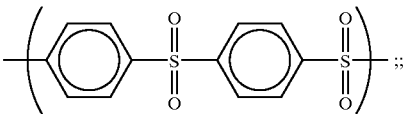

(X)

about 0.1 to about 4% by weight of a fluorinated polyolenfin; and
about 0.1 to about 5% by weight of a fatty acid amide, wherein the amounts are based on the entire weight of the composition.

22. A resin composition consisting essentially of:
a polysulfone of polyetherasulfone resin with a glass transition temperature of at least 180° C. wherein the polysulfone and/or polyethersulfone consist essentially of repeating units selected from the group consisting of

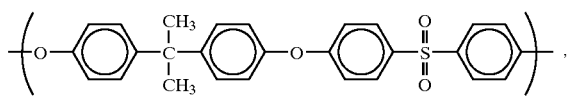

(VI)

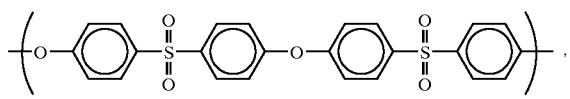

(VII)

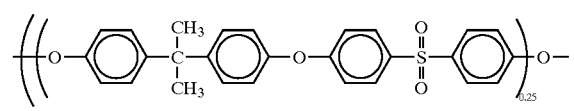

(VIII)

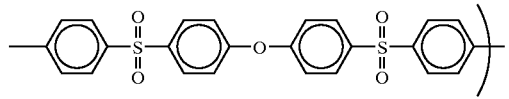

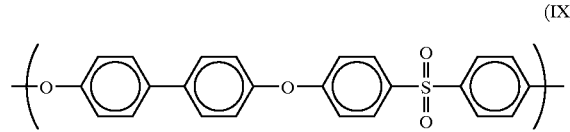

(IX)

and

-continued

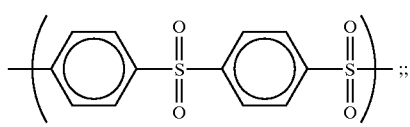
(X)

about 0.1 to about 4% by weight of a fluorinated polyolefin;

about 0.1 to about 5% by weight of fatty acid amide; and up to 50% by weight of mineral filler, wherein the amounts are based on the entire weight of the composition.

23. A resin composition comprising:

a) a polysulfone resin, a polyethersulfone resin or a blend containing one of the foregoing resins with a glass transition temperature of at least 180° C. wherein the polysulfone and/or polyethersulfone consist essentially of repeating units selected from the group consisting of

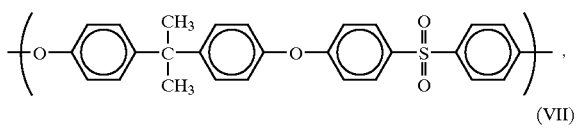
(VI)

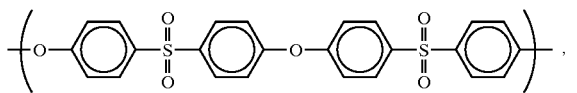
(VII)

-continued

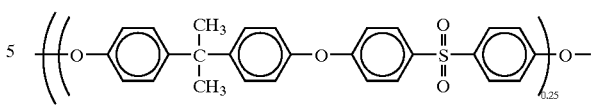
(VIII)

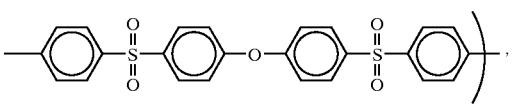

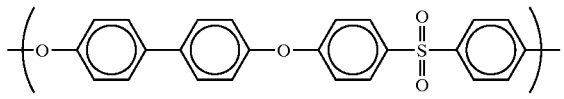
(IX)

and

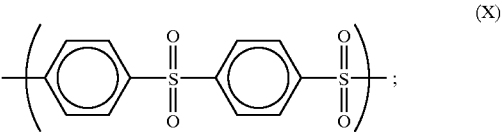
(X)

b) at least one fluorinated polyolefin ina a amount up to about 4% by weight effective to reduce food deposit adhesion on cookware made from the composition; and c) a fatty acid amide, fatty acid ester and a mixture of the foregoing.

* * * * *